(12) United States Patent
Goto

(10) Patent No.: US 6,385,375 B1
(45) Date of Patent: May 7, 2002

(54) STRUCTURE SHIELDING STRAY LIGHT AT OPTICAL WAVEGUIDE MODULE AND OPTICAL TRANSCEIVER MODULE USED THIS STRUCTURE

(75) Inventor: Akio Goto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/699,504

(22) Filed: Oct. 31, 2000

(30) Foreign Application Priority Data

Nov. 4, 1999  (JP) ............................................. 11-313170

(51) Int. Cl.⁷ ................................................. G02B 6/30
(52) U.S. Cl. ............................. 385/49; 385/88; 385/92
(58) Field of Search ............................. 385/49, 14, 88, 385/92, 12; 372/50, 45

(56) References Cited

U.S. PATENT DOCUMENTS 5,764,826 A * 6/1998 Kuhara et al. ............ 385/88 X

* cited by examiner

Primary Examiner—Phan T. H. Palmer
(74) Attorney, Agent, or Firm—McGinn & Gibb, PLLC

(57) ABSTRACT

A structure shielding stray light at an optical waveguide module and an optical transceiver module used this structure, in which stray light circulated from an laser diode (LD) to a photo diode (PD) for receiving optical signals is shielded and the deterioration of the receiving sensitivity caused by the stray light can be prevented and improved, are provided. At the optical waveguide module used this structure, the upper surface of a waveguide substrate covered with a waveguide clad is covered with a metal deposition except an LD mounting area and a V shaped groove for mounting an optical fiber. The metal deposition being made of, for example, Au or WSi has a characteristic that does not make light of a wavelength band used in optical communication penetrate and reflects the light having the wavelength band used in the optical communication. The bottom surface and the side surfaces of the waveguide substrate are also covered with the metal deposition except a waveguide core part.

10 Claims, 2 Drawing Sheets

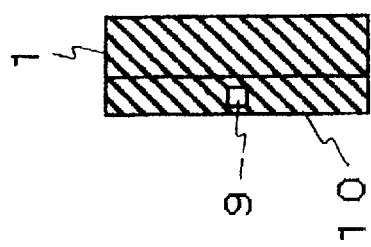
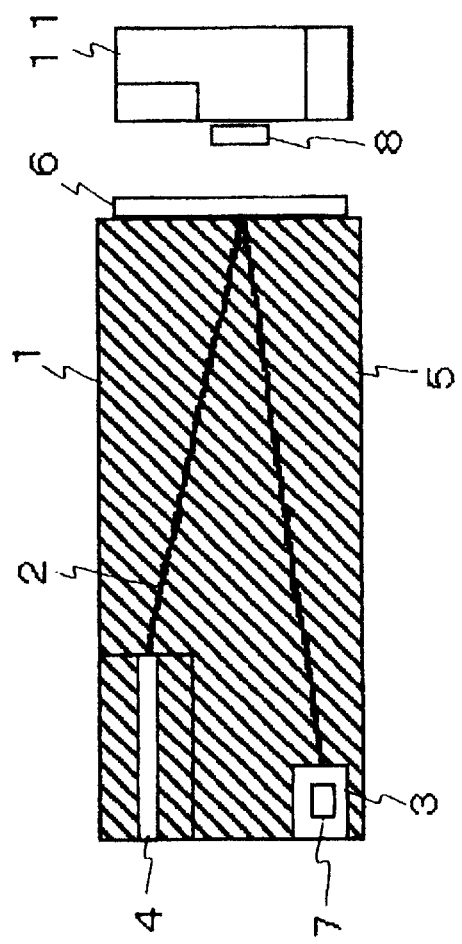
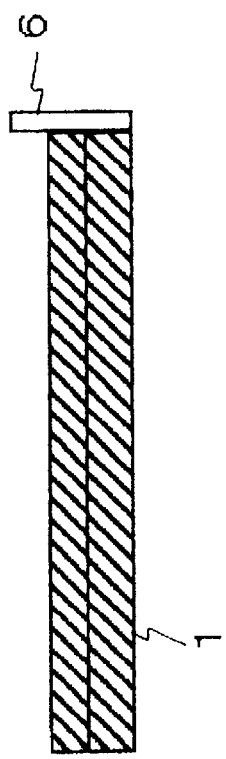

STRUCTURE SHIELDING STRAY LIGHT AT OPTICAL WAVEGUIDE MODULE AND OPTICAL TRANSCEIVER MODULE USED THIS STRUCTURE

BACKGROUND OF THE INVENTION

The present invention relates to a structure shielding stray light at an optical waveguide module and an optical transceiver module used this structure, in particular, an optical transceiver module in which a transmitting function and a receiving function are unified by using a waveguide.

DESCRIPTION OF THE RELATED ART

Recently, an application field of optical communication has been rapidly transferring from a trunk line to a subscriber line. An optical waveguide module using in an optical subscriber line system has been required to be small sized and low cost. Therefore, an optical transceiver module, in which a transmitting function and a receiving function are unified by using an optical waveguide module, has been widely used.

At the optical transceiver module, a laser diode (LD) for transmitting optical signals and a photo diode (PD) for receiving optical signals are integrated in one optical transceiver module. And as the optical transceiver module, there are an optical transceiver module in which transmitting and receiving optical signals are operated simultaneously, and an optical transceiver module in which transmitting optical signals and receiving optical signals are operated alternately by using time division operation.

However, at a conventional optical transceiver module in which transmitting and receiving optical signals are operated simultaneously, LD light not coupled with a waveguide core part circulates to the PD for receiving optical signals as stray light. This stray light becomes noise against the optical signals, consequently, the receiving characteristic such as receiving sensitivity of the optical transceiver module is deteriorated.

And at a conventional optical transceiver module in which transmitting and receiving optical signals are operated alternately by using the time division operation, when the stray light circulated from the LD to the PD for receiving optical signals is radiated to a part not being a receiving surface of the PD, since a diffusion time of a carrier generated in the PD is longer than a diffusion time of a carrier generated on the receiving surface, noise whose time constant is long is generated. Consequently, the receiving sensitivity of the optical transceiver module is deteriorated soon after changing the operation from transmitting to receiving.

The radiation path of the stray light circulated from the LD to the PD for receiving optical signals becomes complex because of the multiple reflection of the stray light in the waveguide. Therefore, at the conventional optical transceiver module, it was impossible to shield the stray light so that the stray light from the LD is not made to circulate to the PD for receiving optical signals.

SUMMARY OF THE INVENTION

It is therefore an object of the present invention to provide a structure shielding stray light at an optical waveguide module and an optical transceiver module used this structure, in which stray light of an LD circulated to a PD for receiving optical signals can be shielded and the deterioration of the receiving characteristic such as receiving sensitivity caused by the stray light can be prevented and the receiving characteristic can be improved.

According to the present invention, a structure shielding stray light at an optical waveguide module is provided. The structure shielding stray light at the optical waveguide module provides a waveguide pattern formed on a waveguide substrate, a laser diode (LD) mounting area formed on the waveguide substrate, a V shaped groove for mounting an optical fiber formed in the waveguide substrate, a waveguide clad formed on the upper surface of the waveguide substrate in which the waveguide pattern and the LD mounting area and the V shaped groove for mounting the optical fiber were formed, a waveguide core part, formed on the end surface of the waveguide clad, for radiating light, and a metal deposition, which covers the surfaces of the waveguide substrate and the surface of the waveguide clad except the waveguide core part and the LD mounting area and the V shaped groove for mounting the optical fiber, having a characteristic that does not make stray light transmitting through the other part of the waveguide core part penetrate and reflects the stray light, and shuts the stray light in the waveguide substrate and the waveguide clad.

According to the present invention, an optical transceiver module unifying a transmitting function and a receiving function at optical communication is provided. The optical transceiver module unifying the transmitting function and the receiving function at the optical communication provides an optical waveguide module. The optical waveguide module provides a waveguide pattern formed on a waveguide substrate, a laser diode (LD) mounting area formed on the waveguide substrate, a V shaped groove for mounting an optical fiber formed in the waveguide substrate, a waveguide clad formed on the upper surface of the waveguide substrate in which the waveguide pattern and the LD mounting area and the V shaped groove for mounting the optical fiber were formed, a waveguide core part, formed on the end surface of the waveguide clad, for radiating light, and a metal deposition, which covers the surfaces of the waveguide substrate and the surface of the waveguide clad except the waveguide core part and the LD mounting area and the V shaped groove for mounting the optical fiber, having a characteristic that does not make stray light transmitting through the other part of the waveguide core part penetrate and reflects the stray light, and shuts the stray light in the waveguide substrate and the waveguide clad.

According to the present invention, the structure shielding the stray light at the optical waveguide module is a structure in which the upper surface covered with the waveguide clad of the waveguide substrate and the bottom surface of the waveguide substrate and the sides of the waveguide substrate are covered with a metal deposition except the waveguide core part, the LD mounting area and the V shaped groove for mounting the optical fiber.

According to the present invention, the structure shielding the stray light at the optical waveguide module is a structure in which a metal deposition formed such as an evaporation method covers the waveguide substrate and the waveguide clad and shuts stray light transmitting through the other part of the waveguide core part in the waveguide substrate and the waveguide clad and does not makes the stray light penetrate to the outside of the waveguide substrate and the waveguide clad. In this case, the metal deposition does not make light of a wavelength band using in optical communication penetrate and reflects the light of the wavelength band in the optical communication.

According to the present invention, at the structure shielding the stray light at the optical waveguide module, instead of using the metal deposition, a resin coat, which does not makes the light of the wavelength band using in the optical communication penetrate and reflect or absorbs the light using in the optical communication, can be used.

According to the present invention, the stray light not coupled to the waveguide core part and radiated to the inside of the waveguide substrate and the waveguide clad is not made to radiate to the outside of the waveguide substrate and the waveguide clad and can be shut in the waveguide substrate and the waveguide clad. Therefore, at the optical transceiver module in which transmitting and receiving optical signals are operated simultaneously, the stray light can not be circulated from the LD to the PD for receiving optical signals. Consequently, the deterioration of the receiving characteristic such as the receiving sensitivity caused by the stray light can be prevented and improved.

According to the present invention, at the structure shielding the stray light at the optical waveguide module, optical signals from the optical fiber can be received because the waveguide core part is not covered with the metal deposition, therefore, the function to receive the optical signals is not damaged and only the stray light from the LD can be shielded. And at the structure to coat the resin material, the same effect that the metal deposition has can be obtained.

According to the present invention, at the structure shielding the stray light at the optical waveguide module, forming the metal deposition on the surfaces of the waveguide substrate and the waveguide clad can be performed with forming electrodes of the LD mounting area at the same time, therefore, any additional forming process is not required. In case that the resin material is used, by masking the LD mounting area and the waveguide core part, and the V shaped groove for mounting the optical fiber, the resin material can be coated easily at the same time, therefore, the shielding structure can be added easily.

BRIEF DESCRIPTION OF THE DRAWINGS

The objects and features of the present invention will become more apparent from the consideration of the following detailed description taken in conjunction with the accompanying drawings in which:

FIG. 1A is a top view of a first embodiment of an optical waveguide module of the present invention;

FIG. 1B is an end view of the first embodiment of the optical waveguide module of the present invention;

FIG. 1C is a side view of the first embodiment of the optical waveguide module of the present invention.

DESCRIPTION OF THE PREFERRED EMBODIMENTS

Figure 2:
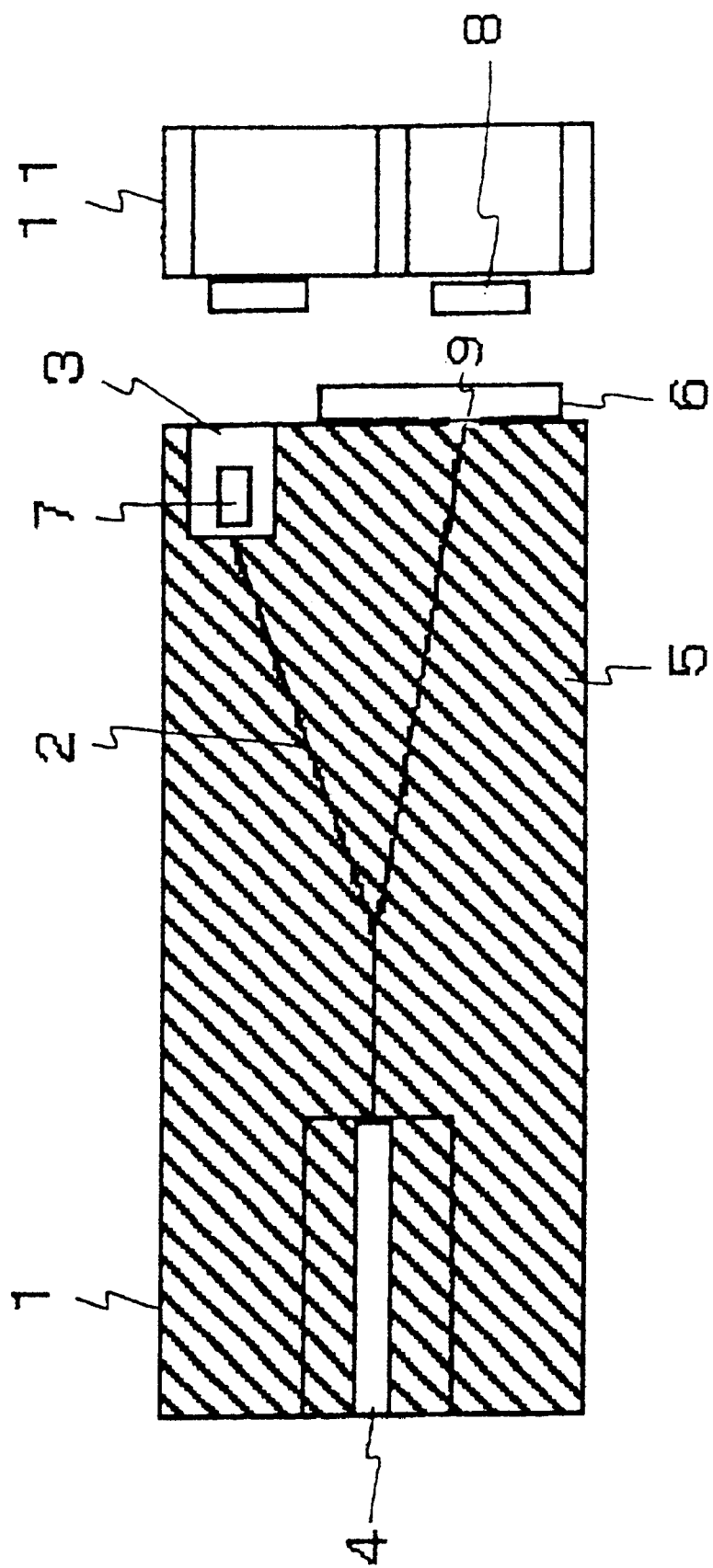
FIG. 2 is a top view of a second embodiment of the optical waveguide module of the present invention.

Referring now to the drawings, embodiments of the present invention are explained in detail. FIG. 1A is a top view of a first embodiment of an optical waveguide module of the present invention. FIG. 1B is an end view of the first embodiment of the optical waveguide module of the present invention. FIG. 1C is a side view of the first embodiment of the optical waveguide module of the present invention.

As shown in FIGS. 1A, 1B, and 1C, the first embodiment of the optical waveguide module of the present invention provides a waveguide substrate 1, a waveguide pattern 2 formed on the waveguide substrate 1, an LD mounting area 3 formed on the waveguide substrate 1, a V shaped groove for mounting an optical fiber 4 formed in the waveguide substrate 1, and a waveguide clad 10 formed on the waveguide substrate 1 in which the waveguide pattern 2, the LD mounting area 3, and the V shaped groove for mounting the optical fiber were formed.

On the waveguide clad 10 formed on the upper surface of the waveguide substrate 1, on which the waveguide pattern 2 is formed, is covered with a metal deposition 5 formed by a metallizing method such as an evaporation method, a sputtering method, or a plating method except the LD mounting area 3 and the V shaped groove for mounting the optical fiber 4. The metal deposition 5 made of Au or WSi formed by the evaporation method has a characteristic that light of a wavelength band using at optical communication is not penetrated and is reflected.

As the same as the upper surface of the waveguide substrate 1 including the waveguide clad 10, the bottom surface and the side surfaces of the waveguide substrate 1 are covered with the metal deposition 5. As shown in FIG. 1B, by covering a waveguide core part 9, from which the light is radiated, with a mask, the end surface is covered with the metal deposition 5, except the waveguide core part 9. As mentioned above, the waveguide substrate 1 including the waveguide clad 10 is covered with the metal deposition 5 except the waveguide core part 9, the LD mounting area 3, and the V shaped groove for mounting the optical fiber 4.

Instead of using the metal deposition 5, by coating a resin material, which does not make the light of the wavelength band using at the optical communication penetrate and absorbs or reflects the light of the wavelength band using at the optical communication, on the mentioned above surfaces of the waveguide substrate 1 including the waveguide clad 10, an equivalent effect to use the metal deposition 5 can be obtained.

At the first embodiment of the optical waveguide module of the present invention, a part of optical signals from the LD 7 transmits through the waveguide core part 9 by coupling with the waveguide core part 9. All of the optical signals transmitted through the waveguide core part 9 are reflected at a filter 6 at the end surface of the waveguide substrate 1 and are transmitted to a transmission line by coupling with an optical fiber (not shown) from the waveguide core part 9.

Optical signals from the transmission line couple with the waveguide core part 9 through the optical fiber, and penetrate through the filter 6 at the end surface of the waveguide substrate 1 and is received at a PD 8 for receiving optical signals mounted on a stem 11.

At the optical transceiver module, in which the wavelength for transmitting optical signals and the wavelength for receiving optical signals are made to be different and the transmitting and receiving are operated simultaneously, when a part of the transmitting light of the LD 7 circulates to the PD 8 for receiving optical signals, the circulated light becomes noise against the received optical signals. Consequently, the receiving characteristic such as the receiving sensitivity is deteriorated.

The coupling efficiency between the LD 7 and the waveguide core part 9 is about 50% at the maximum, and the light from the LD 7 not to be coupled with the waveguide core part 9 and being the remaining light is radiated into a waveguide clad 10 and the waveguide substrate 1. This remaining light transmits through the waveguide clad 10 and the waveguide substrate 1 in a state that the remaining light becomes the stray light by the multiple reflection. When this stray light is radiated into the PD 8 for receiving optical signals, as mentioned above, the receiving characteristic such as the receiving sensitivity is deteriorated.

At the structure of the first embodiment of the optical waveguide module of the present invention, the stray light outputted from the LD 7, which did not coupled with the waveguide core part 9 and radiated into the waveguide clad 10 and the waveguide substrate 1, is shut in the waveguide substrate 1 and the waveguide clad 10 by the metal deposition 5, and is not radiated to the outside of the optical waveguide module.

On the end surface of the waveguide substrate 1 of the optical waveguide module, the surface except the waveguide core part 9 is covered with metal deposition 5, therefore, at the structure of the optical waveguide module, the light from the LD 7 radiated into the waveguide clad 10 and the waveguide substrate 1 is not radiated to the outside of the optical transceiver module from the end surface of the waveguide substrate 1 of the optical waveguide module. The optical signals transmitted from the optical fiber are radiated from the waveguide core part 9, which is not covered with the metal deposition 5, at the end surface of the optical waveguide module, and the radiated optical signals are received at the PD 8 for receiving optical signals.

In case that the resin material is coated to the waveguide substrate 1 and the waveguide clad 10, as the same as the metal deposition 5 is used, the stray light in the optical waveguide module is not penetrated through the resin material and is absorbed or reflected at the resin material. Therefore, the stray light is not radiated to the outside of the optical waveguide module, consequently, the equivalent effect used the metal deposition 5 can be obtained at the resin material.

As mentioned above, at the structure of the optical waveguide module of the present invention, the stray light, which did not couple with the waveguide core part 9 and radiated into the waveguide substrate 1 and the waveguide clad 10, is not radiated to the outside of the optical waveguide module and can be shut in the optical waveguide module.

As mentioned above, at an optical transceiver module in which transmitting and receiving optical signals are operated simultaneously, the optical signals from the LD7 are not almost circulated to the PD 8 for receiving optical signals. Therefore, the conventional problem, in which the receiving characteristic such as the receiving sensitivity is deteriorated caused by the stray light in the waveguide substrate 1, can be prevented and improved.

Optical signals from the optical fiber can be received because the waveguide core part 9 is not covered with the metal deposition 5, therefore, the function to receive the optical signals is not damaged and the stray light from the LD 7 can be shielded. And at the structure coated with the resin material, the same effect that the metal deposition 5 has can be obtained.

Moreover, forming the metal deposition 5 on the surfaces of the waveguide substrate 1 and the waveguide clad 10 can be performed with forming electrodes of the LD mounting area 3 at the same time, therefore, any additional forming process is not be required.

Even in case that the resin material is used instead of the metal deposition 5, by masking the LD mounting area 3 and the waveguide core part 9 and the V shaped groove for mounting the optical fiber 4, the surfaces of the waveguide substrate 1 and the waveguide clad 10 can be coated with the resin material at the same time, therefore, the shielding function can be easily added.

Next, referring to a drawing, a second embodiment of the optical waveguide module of the present invention is explained. FIG. 2 is a top view of the second embodiment of the optical waveguide module of the present invention. At the second embodiment, a function that is almost equivalent to the first embodiment has the same reference number that the first embodiment has. As shown in FIG. 2, at the second embodiment, the disposition of each function is different from the first embodiment.

At the second embodiment, as the same as the first embodiment, except an LD mounting area 3 and a waveguide coar part 9 and a V shaped groove for mounting an optical fiber 4, the surfaces being the upper surface covered with the waveguide clad 10, the bottom surface, and the side surfaces of the waveguide substrate 1 are covered with the metal deposition 5 or coated with the resin material.

As the same as the first embodiment, the stray light from the LD 7 is shut in the waveguide substrate 1 and the waveguide clad 10 and is not radiated to the outside of the waveguide substrate 1 and the waveguide clad 10. Further, the optical signals from the LD7 are not circulated to the PD 8 for receiving optical signals. Therefore, at the optical transceiver module in which transmitting and receiving optical signals are operated simultaneously, the conventional problem, which the receiving characteristic such as the receiving sensitivity is deteriorated caused by noise having a long time constant soon after the operation is changed to receiving, can be improved.

As mentioned above, according to the present invention, an optical waveguide module provides a waveguide pattern, an LD mounting area, and a V shaped groove for mounting an optical fiber on a waveguide substrate, and further provides a waveguide core part from which light is radiated on the end surface of the waveguide substrate. And the surfaces of the waveguide substrate and a waveguide clad are covered with a metal deposition having a characteristic that does not make stray light transmitting through a part not being the waveguide core part penetrate but makes the stray light reflect. And the stray light transmitting through a part not being the waveguide core part is shut in the waveguide substrate and the waveguide clad by the metal deposition. With the structure mentioned above, the stray light, which circulates from an LD to a PD for receiving optical signals, can be shielded. Consequently, the receiving characteristic such as the receiving sensitivity, which is deteriorated by the stray light, can be improved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A structure shielding stray light at an optical waveguide module, comprising:

a waveguide pattern formed on a waveguide substrate;

a laser diode (LD) mounting area formed on said waveguide substrate;

a V shaped groove for mounting an optical fiber formed in said waveguide substrate;

a waveguide clad formed on the upper surface of said waveguide substrate in which said waveguide pattern and said LD mounting area and said V shaped groove for mounting said optical fiber were formed;

a waveguide core part, formed on the end surface of said waveguide clad, for radiating light; and a metal deposition, which covers the surfaces of said waveguide substrate and the surface of said waveguide clad except said waveguide core part and said LD mounting area and said V shaped groove for mounting said optical fiber, having a characteristic that does not make stray light transmitting through the other part of said waveguide core part penetrate and reflects said stray light, and shuts said stray light in said waveguide substrate and said waveguide clad.

2. A structure shielding stray light at an optical waveguide module in accordance with claim 1, wherein:

said metal deposition has a characteristic that does not make light of a wavelength band used in optical communication penetrate and reflects said light of said wavelength band used in said optical communication.

3. A structure shielding stray light at an optical waveguide module in accordance with claim 1, wherein:

said metal deposition is formed at least by any one of an evaporation method, a sputtering method, and a plating method.

4. A structure shielding stray light at an optical waveguide module in accordance with claim 1, wherein:

said metal deposition is replaced with a resin coat which has a characteristic that does not make light having a wavelength band used in optical communication penetrate and reflects said light having said wavelength band used in said optical communication.

5. A structure shielding stray light at an optical waveguide module in accordance with claim 1, wherein:

said metal deposition is replaced with a resin coat which has a characteristic that does not make light having a wavelength band used in optical communication penetrate and absorbs said light having said wavelength band used in said optical communication.

6. An optical transceiver module unifying a transmitting function and a receiving function at optical communication, comprising:

an optical waveguide module, providing:

a waveguide pattern formed on a waveguide substrate;

a LD mounting area formed on said waveguide substrate;

a V shaped groove for mounting an optical fiber formed in said waveguide substrate;

a waveguide clad formed on the upper surface of said waveguide substrate in which said waveguide pattern and said LD mounting area and said V shaped groove for mounting said optical fiber were formed;

a waveguide core part, formed on the end surface of said waveguide clad, for radiating light; and a metal deposition, which covers the surfaces of said waveguide substrate and the surface of said waveguide clad except said waveguide core part and said LD mounting area and said V shaped groove for mounting said optical fiber, having a characteristic that does not make stray light transmitting through the other part of said waveguide core part penetrate and reflects said stray light, and shuts said stray light in said waveguide substrate and said waveguide clad.

7. An optical transceiver module unifying a transmitting function and a receiving function at optical communication in accordance with claim 6, wherein:

said metal deposition has a characteristic that does not make light of a wavelength band used in optical communication penetrate and reflects said light of said wavelength band used in said optical communication.

8. An optical transceiver module unifying a transmitting function and a receiving function at optical communication in accordance with claim 6, wherein:

said metal deposition is formed at least by any one of an evaporation method, a sputtering method, and a plating method.

9. An optical transceiver module unifying a transmitting function and a receiving function at optical communication in accordance with claim 6, wherein:

said metal deposition is replaced with a resin coat which has a characteristic that does not make light having a wavelength band used in optical communication penetrate and reflects said light having said wavelength band used in said optical communication.

10. An optical transceiver module unifying a transmitting function and a receiving function at optical communication in accordance with claim 6, wherein:

said metal deposition is replaced with a resin coat which has a characteristic that does not make light having a wavelength band used in optical communication penetrate and absorbs said light having said wavelength band used in said optical communication.

\* \* \* \* \*